United States Patent [19]

Buchschmid et al.

[11] Patent Number: 5,039,942

[45] Date of Patent: Aug. 13, 1991

[54] CABLE SUPPORTING INSERT CLOSING AN OPENING IN THE HOUSING OF AN INDUCTIVE ROTATIONAL SPEED SENSOR

[75] Inventors: Emil Buchschmid, Rosstal; Erich Ebenhöh, Ansbach; Michael Moog, Leinfelden-Echterdingen; Werner Huber, Schwaikhaim; Berthold Stritzel, Ansbach, all of Fed. Rep. of Germany

[73] Assignee: Robert Bosch GmbH, Stuttgart, Fed. Rep. of Germany

[21] Appl. No.: 425,164

[22] PCT Filed: Jan. 20, 1988

[86] PCT No.: PCT/DE88/00027

§ 371 Date: Aug. 18, 1989

§ 102(e) Date: Aug. 18, 1989

[87] PCT Pub. No.: WO88/06735

PCT Pub. Date: Sep. 7, 1988

[30] Foreign Application Priority Data

Feb. 26, 1987 [DE] Fed. Rep. of Germany ....... 3706168

[51] Int. Cl.[5] .......................... G01P 3/44; G01P 3/488; H01R 13/58; H05K 5/06
[52] U.S. Cl. .................... 324/174; 174/52.2; 174/65 G; 324/207.15; 336/96; 439/449; 439/467
[58] Field of Search ........ 524/173, 174, 208, 229–231, 524/234, 236–239, 207.15, 207.16, 207.25; 439/449, 460, 467; 73/661; 174/52.2, 52.3, 65 G; 336/96

[56] References Cited

U.S. PATENT DOCUMENTS

| 3,719,841 | 3/1973 | Ritsema ...................... 310/168 X |
| 3,793,545 | 2/1974 | Leiber et al. .................. 310/168 |
| 4,103,136 | 7/1978 | Karakis et al. ............... 174/65 G X |
| 4,646,042 | 2/1987 | Eshelman ...................... 324/174 X |
| 4,652,818 | 3/1987 | Buchschmid et al. ............ 324/174 |
| 4,680,543 | 7/1987 | Kohen ........................... 324/173 X |
| 4,829,245 | 5/1989 | Echasseriau et al. ........... 324/174 |
| 4,847,557 | 7/1989 | Saito et al. .................... 324/173 X |

FOREIGN PATENT DOCUMENTS

| 1098567 | 8/1958 | Fed. Rep. of Germany ... 174/65 G |
| 2516193 | 10/1976 | Fed. Rep. of Germany ...... 324/174 |
| 8400738 | 6/1985 | Fed. Rep. of Germany . |
| 2128827 | 10/1972 | France . |
| 2576245 | 7/1986 | France . |

*Primary Examiner*—Gerard R. Strecker
*Attorney, Agent, or Firm*—Michael J. Striker

[57] ABSTRACT

A measurement pickup comprising a housing having a side opening, a measuring element located in the housing, a connection cable extending through the side opening and connected with the measuring element, and a closing part located in the side opening closing the side opening and fixing the connection cable at least in one direction and a body of plastic material injected into the housing for sealing the measuring element.

9 Claims, 2 Drawing Sheets

CABLE SUPPORTING INSERT CLOSING AN OPENING IN THE HOUSING OF AN INDUCTIVE ROTATIONAL SPEED SENSOR

BACKGROUND OF THE INVENTION

The invention relates to a measurement pickup comprising a measuring element and a connection cable. In a known measurement pickup the connection cable is enclosed with a plastics substance and inserted in a pickup housing opening. The connection cable can accordingly be loosened easily during installation or operation in the housing opening, so that the electrical contacts can rupture. In addition, moisture can penetrate into the interior of the measurement pickup through an occurring clearance and can falsify the measured values and make the measurement pickup unusable, e.g. due to corrosion.

SUMMARY OF THE INVENTION

The object of the invention is to eliminate the foregoing drawbacks of known prior art pickups. The object of the invention is achieved by providing in a measuring pickup a closing part located in the housing opening for fixing the cable therein. The measurement pickup, according to the invention, has the advantage that it is constructed so as to be very simple, robust and inexpensive. The connection cable is fastened in the connection opening of the housing in all directions by the closing part or closing end. It is secured against pulling and pushing in its axial direction and, at the same time, against being pulled out in a direction approximately perpendicular to the axial direction.

The closing part serves for fixing the connection cable and as a boundary part during the sealing or plugging of the housing with plastic material. Moisture is effectively prevented from penetrating into the interior of the measurement pickup by the plastics seal. Costly boundaries for preventing the plastics material from flowing out during the production of the measurement pickup are no longer necessary, so that the measurement pickup is very inexpensive to produce. The parts of the measurement pickup can be combined in several groups which are tested for function already before assembly. Prior to finishing, the sealing of the housing of the measurement pickup, the measurement pickup can easily be tested for overall function.

The projection attached to the inside wall of the housing enables a simple installation and a fixing of the measurement elements which are combined as a group, particularly the coil body. In addition, the measurement elements can not tilt during sealing.

DESCRIPTION OF THE PREFERRED EMBODIMENTS

Figure 1:
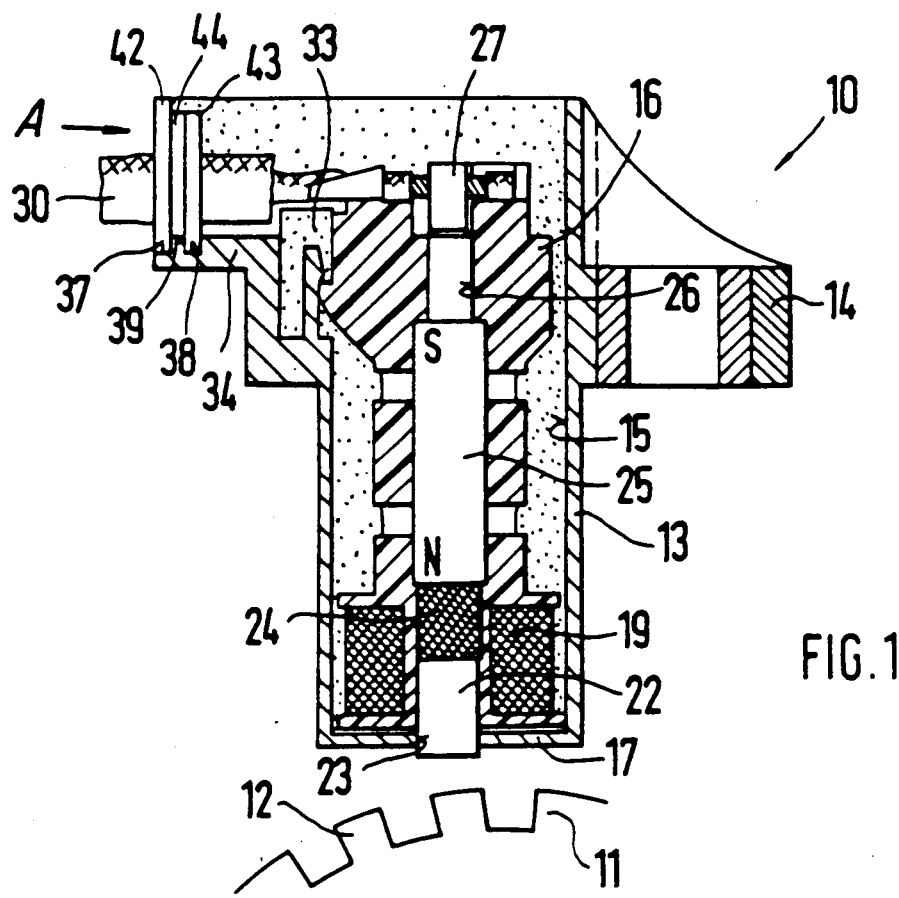
FIG. 1 shows a longitudinal cross-sectional view of measurement pickup, according to the invention.

A measurement pickup for measuring the number of revolutions of a wheel, not shown, of a motor vehicle is designated by 10 in FIG. 1. The measurement pickup 10 is constructed as an inductive rotational speed sensor and forms a part of an antiskid system of the motor vehicle. It cooperates with a rotating toothed ring 11 which is fastened at the wheel and is shown only in part with several teeth 12. The measurement pickup 10 has a housing 13 which is produced from plastic or metal. It comprises a fastening flange 14 with which it can be fastened at the motor vehicle. A former 16 is arranged in the interior 15 of the housing 13, an electrical winding 19 being arranged at the end of the former 16 facing the base 17 of the housing 13. The winding 19 with the former 16 sits on a pole pin 22 whose front end projects through a central housing opening 23 and is in a operating connection with the teeth 12. The pole piece comprises a soft-magnetic material and the teeth are of a magnetically active material.

Figure 2:
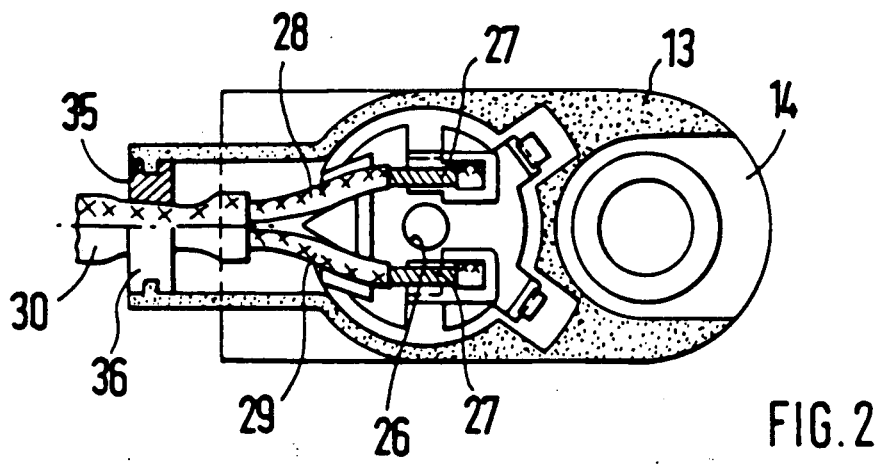
FIG. 2 shows a top view of the measurement pickup.

At its other end, the pole pin 22 comprises a roughened portion 24 which serves for an improved fastening of the pole pin 22 in the former 16 formed of plastic. A bar-shaped permanent magnet 25 is arranged above the latter in a known manner. The former 16 further comprises a bore hole 26 which serves to receive a locking part for the permanent magnet 25 during the spraying of the former 16. The winding 19 is connected with the strands 28, 29 of a connection cable 30 by two busbars 27. As shown in FIG. 2, the busbars 27 lead to the winding 19 outside the former 16 parallel to the permanent magnet 25.

The former 16 is fastened in the interior of the housing 13 by a projection 33 and pressed on the base 17. The projection 33 can be formed directly on the wall of the housing 13 or can be an additional insert part.

A trough-shaped upper part 34 of the housing, which upper part 34 is open at the top, comprises an opening 35 for the connection cable 30. The trough-shaped construction additionally gives the connection cable 30 a supporting surface and accordingly prevents it from being torn out by its own weight. A plate-shaped closing part or end 36 for this opening 35 is fastened at the connection cable 30. Two annular grooves 37, 38, which lie close to one another, are formed in the upper part 34 of the housing in the area of the opening 35, so that a small web 39 results between the them. At its perimetric outer wall, the closing part 36 comprises an annular groove 44, which is arranged between two webs 42, 43, with which it engages in the corresponding annular grooves 37, 38 and the web 39. The axial fastening of the connection cable 30 in the housing is accordingly ensured. The closing part 36 simultaneously also closes the opening 35 of the upper part 34 of the housing. The closing part 36 is constructed in such a way that it terminates at its upper side so as to be flush with the upper part of the housing after installation. As can be seen from FIG. 1, the web 43 facing the interior space of the housing 13 should not be constructed at the upper side of the closing part 36. An improved contact of the closing part 36 with the sealing compound, which is to be applied subsequently, as discussed below, is accordingly made possible.

Figure 3:
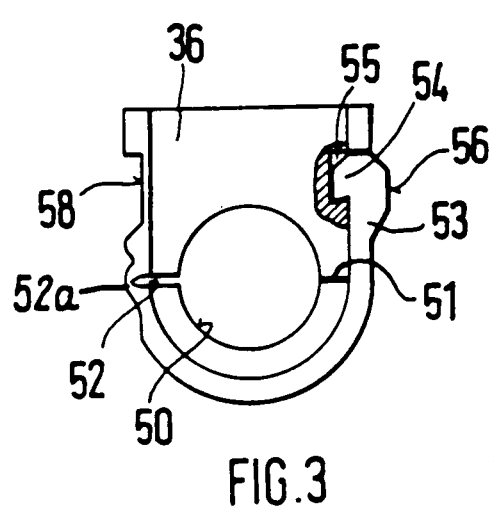
FIG. 3 shows a view of the closing part as seen along arrow A in FIG 1.

As shown in FIG. 3, the closing part comprises an approximately central bore hole 50 for receiving the connection cable 30. The closing part 36 is cut along a line 51 which extends radially from the bore hole 50. A slot 52 is constructed diametrically opposite the opening of the line 51 into the bore hole 50 at the inner wall of this bore hole 50. The slot 52 defines a thin wall portion 52a which acts as a hinge. The closing part 36 is accordingly constructed so as to be elastic, i.e. movable, at the thin wall portion 52a of the slot 52 and can be opened along the line 51 for receiving the connection cable. When selecting the section line 51, care must be taken that a somewhat elongate portion 53 of the closing part 36 be formed. The portion 53 comprises a projection 54 with a barb which can engage in a recess 55 of another portion of the closing part 36 which faces it. In addition, the portion 53 has a second projection 56 at its outer wall with which it engages in a recess 57 in the perimetric inner wall of the upper part 34 of the housing shown in FIG. 4. A recess 58, in which a projection 59 of the upper part 34 of the housing engages, is constructed on the outer wall of the closing part 36 located opposite the recess 55.

Figure 4:
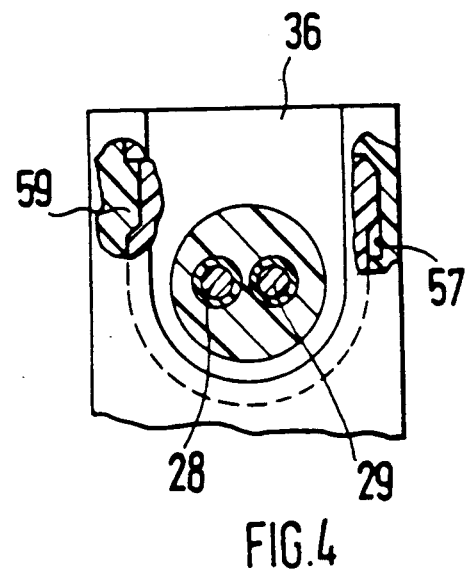
FIG. 4 shows a view of the closing part as seen along arrow A in FIG. 1, in a mounted state.

FIG. 4 shows the closing part 36 installed in the upper part 34 of the housing. The closing part 36 is fixed in the upper part 34 of the housing in the axial direction by means of the operating connection between the recess 57 and the projection 56 and the recess 58 and projection 59, respectively. The construction of the recesses and the projections at the closing part 36 and at the upper part 34 of the housing, respectively, can also be exchanged with respect to one another.

To assemble, the former 16 is inserted with the winding 19, which is already assembled beforehand, the pole piece 22 and the permanent magnet 25 into the housing 13 from the top and is fixed in the interior 15 by the projection 33 and pressed against the base 17. In a separate assembly, the closing part 36 is bent apart along line 51, wherein the point of rotation is located at the edge of the slot 52. The closing part 36 can accordingly embrace the connection cable 30. Subsequently, the projection 54 of the part 53 catches in the recess 55, particularly with the barb. The size of the bore hole 50 is to be adapted to the diameter of the connection cable 30, so that the closing part 36 fits firmly on the connection cable 30. The closing part 36 with its two webs 42, 43 is then inserted into the two annular grooves 37, 38 of the upper part 34 of the housing. In so doing, the projection 56 also simultaneously engages in the recess 57, and the projection 59 of the upper part 34 of the housing engages in the recess 58. The projections and the recesses act as locks, so that the closing part 36 is securely inserted into the upper part 34 of the housing and can also not be torn out. Another section line 51 is also conceivable; however, it is decisive that a connection be formed which, if possible, can no longer be detached in the vertical direction, i.e. in the direction of the longitudinal axis of the coil body 16 after installation.

The strands 28, 29 of the connection cable 30 are subsequently soldered to the busbars 27. Finally, the housing 13 is sealed with a plastics material, e.g. a resin, and accordingly sealed so as to be tight against moisture.

Figure 5:
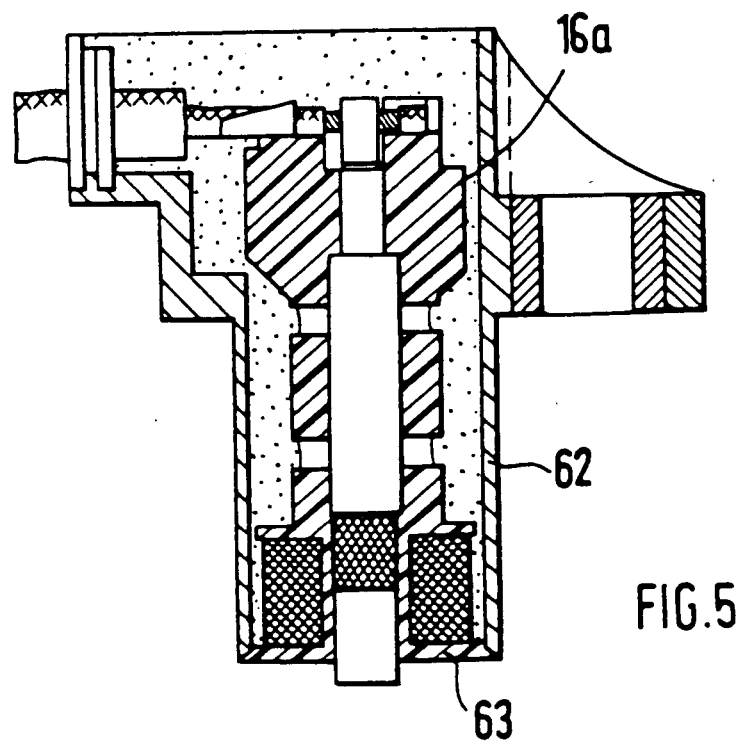
FIG. 5 shows a longitudinal cross-sectional view of a modification of the measurement pickup according to FIG. 1.

A modified embodiment is shown in FIG. 5. A housing 62 which is open at the bottom is used in this instance. During assembly, the coil body 16a is introduced into the housing 62 from below. The coil body 16a comprises a plate-shaped closing part 63 which can serve simultaneously as a base for the housing 62. This closing part 63 is fastened at the housing 62 after the insertion of the coil body 16a, e.g. by means of ultrasonic welding. Accordingly, the coil body 16a is simultaneously fixed in the housing 62 and the housing 62 itself is closed so as to be tight. A projection in the housing for fastening is no longer necessary. The further construction and production corresponds in an analogous manner to the embodiment described above.

The manner of functioning of rotational speed sensor sensor which operates on an induction principle is conventionally known, so that it need not be discussed in more detail here.

While the invention has been illustrated and described as embodied in a measurement pickup, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A measurement pickup comprising a housing having an opening; a measuring element located in said housing for sensing a speed of a part and generating output signals representative of the sensed speed; a connected cable connected with said measuring element and extending through said opening for communicating the output signals to an appropriate control unit; an end insert closing said opening and supporting said connection cable in said opening fixed at least in one direction; and a body of plastic material located in said housing for sealing said measuring element; said housing including an inner perimetric surface defining said opening and having one of a recess and a projection thereon, said closing end insert having an outer perimetric surface and having another of said recess and said projection formed thereon for engaging said one of said recess and said projection for securing said closing end insert in said opening, said closing end insert having first and second portions defining an opening for receiving said connection cable and having a predetermined diameter, a cut line extending outwardly on one side of the opening diameter and separating said first and second portions, and a thin wall portion in an area opposite said cut line on another side of the opening diameter and acting as a hinge for enabling displacement of said first and second portions relative to each other.

2. A measurement pickup as set forth in claim 1, said surface defining said opening has a recess thereon and an outer surface of said closing end insert has a projection thereon for engaging said recess.

3. A measurement pickup as set forth in claim 2, wherein said outer surface of said closing end insert has a recess formed in said outer surface thereof, and said surface defining said opening has a projection engaged in said recess formed on said outer surface of said closing end insert.

4. A measurement pickup as set forth in claim 1, wherein said surface defining said opening has a projection thereon and said outer surface of closing part has a recess therein engaged with said projection.

5. A measurement pickup as set forth in claim 4, wherein said outer surface of said closing part has a projection thereon; and said surface defining said opening has a recess therein engaged with said projection on said outer surface of said closing part.

6. A measurement pickup as set forth in claim 1, wherein one of said first and second portion comprises, in an area of said cut line, a recess, and another of said first and second portions comprises, in said area of said cut line, a projection engaging said recess for mechanically locking said first and second portions together.

7. A measurement pickup as set forth in claim 1, wherein said measuring element comprises a former, an electric winding supported on said former, a pole member located in said former, and a permanent magnet, said pole member and said permanent magnet being adapted to cooperate with a rotating body to determine a number of revolution thereof.

8. A measurement pickup as set forth in claim 7, wherein said housing is formed of a plastic material and includes a base at a bottom thereof, and an interior having a catch projection for locking said former in said housing.

9. A measurement pickup as set forth in claim 7, wherein said housing is formed of a plastic material and is open at a bottom end, said former including a closing member which forms a base of said housing.

* * * * *